(12) United States Patent
Keohane et al.

(10) Patent No.: US 7,725,342 B2
(45) Date of Patent: May 25, 2010

(54) METHOD, COMPUTER PROGRAM PRODUCT, AND DATA PROCESSING SYSTEM FOR ESTIMATING A NUMBER OF ATTENDEES OF A SCHEDULED EVENT IN AN ELECTRONIC CALENDAR SYSTEM

(75) Inventors: Susann Marie Keohane, Austin, TX (US); Gerald Francis McBrearty, Austin, TX (US); Shawn Patrick Mullen, Buda, TX (US); Jessica K. Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1325 days.

(21) Appl. No.: 10/809,588

(22) Filed: Mar. 25, 2004

(65) Prior Publication Data

US 2005/0216842 A1 Sep. 29, 2005

(51) Int. Cl.
*F06F 9/46* (2006.01)
(52) U.S. Cl. .............................................. 705/8; 705/9
(58) Field of Classification Search .................. 705/8, 705/9
See application file for complete search history.

(56) References Cited

U.S. PATENT DOCUMENTS

| | | | | |
|---|---|---|---|---|
| 4,977,520 | A * | 12/1990 | McGaughey et al. | 715/753 |
| 6,101,480 | A * | 8/2000 | Conmy et al. | 705/9 |
| 6,363,352 | B1 * | 3/2002 | Dailey et al. | 705/9 |
| 7,082,402 | B2 * | 7/2006 | Conmy et al. | 705/8 |
| 7,343,312 | B2 * | 3/2008 | Capek et al. | 705/8 |
| 2003/0149605 | A1 * | 8/2003 | Cragun et al. | 705/8 |
| 2003/0204474 | A1 * | 10/2003 | Capek et al. | 705/64 |
| 2003/0217073 | A1 * | 11/2003 | Walther et al. | 707/104.1 |

OTHER PUBLICATIONS

Heck, Mike. Organizer upgrade adds collaborative features. InfoWorld v19n28 Jul. 14, 1997.*
Horvitz, Eric. Koch, Paul. Kadie, Carl M. Jacobs, Andy. Coordinate: Probabilistic Forecasting of Presence and Availability. Microsoft Research.*
Mynatt, Elizabeth and Tullio, Joe. Inferring Calendar Event Attendance. IUI'01. Jan. 14-17, 2001.*
IBM Technical Disclosure Bulletin, "Assigning Priority for Calendar Events", Mar. 1993, 1 page.
IBM Technical Disclosure Bulletin, "Calendar Scheduling Based on User-Defined Criteria", May 1993, 1 page.
www.centrintiy.com, FirstClass Division 7.1 Feature-rich Affordable Secure, Jan. 21, 2004, 1 page.
U.S. Appl. No. 09/491,893, filed Jan. 26, 2000, Liver, Real-Time Coordinating System.

* cited by examiner

*Primary Examiner*—Johnna Loftis
(74) *Attorney, Agent, or Firm*—Matthew W. Baca; Amy J. Pattillo

(57) ABSTRACT

A plurality of acceptance messages associated with a first scheduled event having a scheduled event time are received. Each of the plurality of acceptance messages are associated with a respective user. A schedule conflict of a user associated with an acceptance message of the plurality of acceptance messages is identified. Responsive to identifying the schedule conflict, a probable attendance is calculated from the plurality of acceptance messages.

3 Claims, 3 Drawing Sheets

METHOD, COMPUTER PROGRAM PRODUCT, AND DATA PROCESSING SYSTEM FOR ESTIMATING A NUMBER OF ATTENDEES OF A SCHEDULED EVENT IN AN ELECTRONIC CALENDAR SYSTEM

BACKGROUND OF THE INVENTION

1. Technical Field

The present invention relates generally to an improved data processing system and in particular to a method and computer program product for an electronic calendar system. Still more particularly, the present invention provides a method and computer program product for an electronic calendar system adapted to evaluate conflicts in calendar events.

2. Description of Related Art

An electronic calendar system is designed to maintain useful information for a user. Electronic calendar systems allow maintenance of a personal schedule of activities such as meeting appointments, teleconference schedules, and the like.

Conventional electronic calendar systems allow users to send electronic invitations to other users and for a user receiving an electronic calendar invitation to either accept or decline the invitation. An invitation typically includes a description of the event, a location of the event, and a scheduled start and end time of the event. An invitation decline message may be returned to the user that issued the invitation when the invitation is declined by an invited user. Likewise, an invitation acceptance message may be returned to the user that issued the invitation when the user accepts the invitation. When a user accepts an invitation, the scheduled event is recorded in the electronic calendar of the accepting user. Additionally, a record of the calendar of the user that issued the invitation is updated to reflect the expected attendance by the accepting user. Accordingly, the calendar of the user that issued the invitation includes an indication of the number of users that have accepted the invitation and the inviting user can plan for the event in response to the anticipated attendance.

A user may sometimes receive invitations for conflicting or concurrently scheduled events. Often, the user will accept an invitation to multiple events that conflict, such as concurrently scheduled events. In such an instance, the user is unable to attend one or more events to which the user has accepted an invitation. Thus, users that have planned for events according to the number of invitation acceptances do not have an accurate indication of the number of attendees that will actually attend the event.

Thus, it would be advantageous for an electronic calendar system to provide an indication of an anticipated attendee count based on the number of invitation acceptances provided in response to an issued invitation. It would further be advantageous to provide an electronic calendar system that provides an anticipated attendee count based on a number of accepted invitations that conflict with other invitation acceptances.

SUMMARY OF THE INVENTION

The invention provides a method, computer program product, and a data processing system for managing event schedules. A plurality of acceptance messages associated with a first scheduled event having a scheduled event time are received. Each of the plurality of acceptance messages are associated with a respective user. A schedule conflict of a user associated with an acceptance message of the plurality of acceptance messages is identified. Responsive to identifying the schedule conflict, a probable attendance is calculated from the plurality of acceptance messages.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
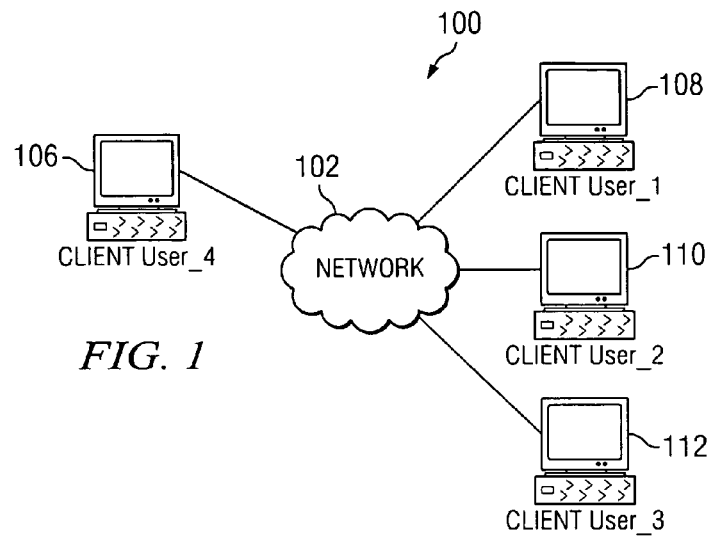
FIG. 1 depicts a pictorial representation of a network of data processing systems in which the present invention may be implemented in accordance with a preferred embodiment of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, clients 106, 108, 110, and 112 are connected to network 102. These clients 106, 108, 110, and 112 may be, for example, personal computers or network computers. Clients 106, 108, 110, and 112 run electronic calendar systems implemented as instruction sets of computer executable code. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
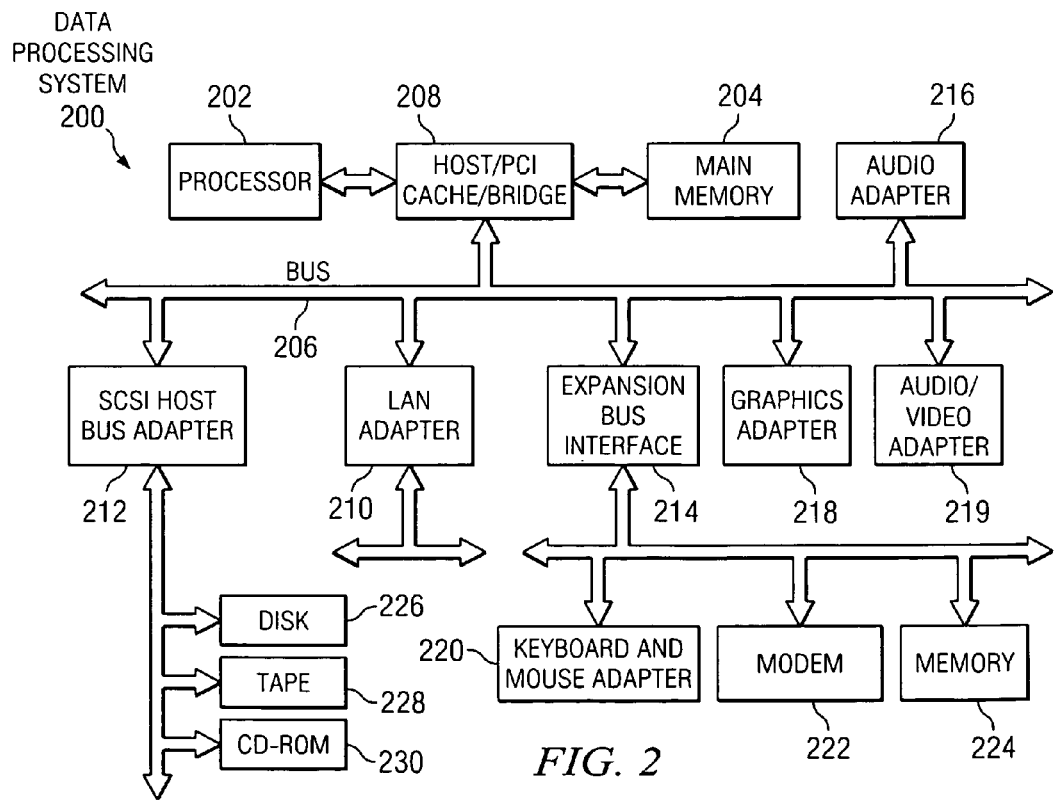
FIG. 2 is a block diagram illustrating a data processing system in which the present invention may be implemented in accordance with a preferred embodiment of the present invention.

With reference now to FIG. 2, a block diagram illustrating a data processing system is depicted in which the present invention may be implemented. Data processing system 200 is an example of a client computer, such as client 106 of FIG. 1. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. Small computer system interface (SCSI) host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as Windows XP, which is available from Microsoft Corporation. An object oriented programming system such as Java may run in conjunction with the operating system and provide calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Data processing system 200 runs an electronic calendar system by which a user may issue event invitations to a plurality of users. A user, referred to herein as an invitee, receiving the invitation may accept or reject the invitation, and a message indicating the invitees response is communicated to data processing system 200. An expected number of attendees is calculated based on the number of acceptance messages and detected schedule conflicts of the invitees. In accordance with a preferred embodiment of the present invention, an invitee acceptance message is accounted for as a single unit in a sum of expected attendees if the invitee has no conflicting scheduled events. An invitee acceptance message is accounted for as a value less than one and is weighted in proportion to the number of detected schedule conflicts as described more fully below.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

As another example, data processing system 200 may be a stand-alone system configured to be bootable without relying on some type of network communication interfaces As a further example, data processing system 200 may be a personal digital assistant (PDA) device, which is configured with ROM and/or flash ROM in order to provide non-volatile memory for storing operating system files and/or user-generated data.

The depicted example in FIG. 2 and above-described examples are not meant to imply architectural limitations. For example, data processing system 300 also may be a notebook computer or hand held computer in addition to taking the form of a PDA. Data processing system 200 also may be a kiosk or a Web appliance.

Figure 3:
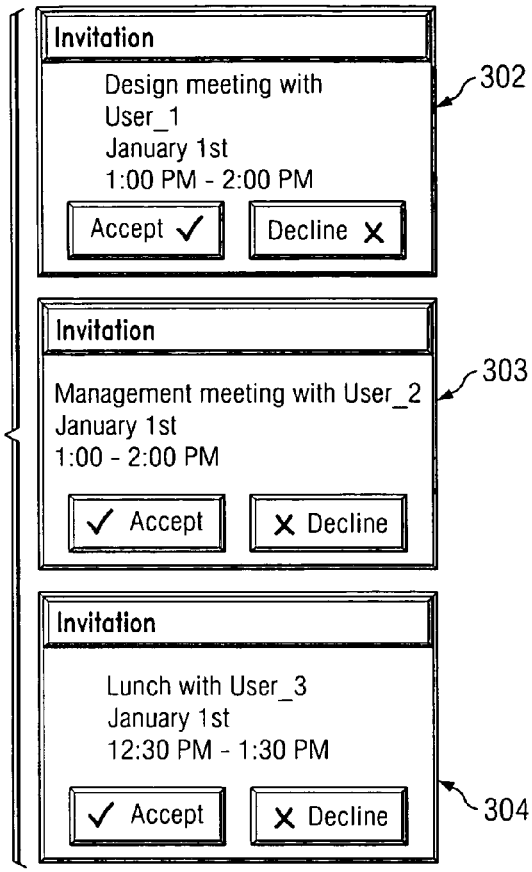
FIG. 3 is a diagrammatic illustration of electronic invitations communicated to a data processing system by clients in a network in accordance with a preferred embodiment of the present invention.

FIG. 3 is a diagrammatic illustration of electronic invitations communicated to a data processing system, such as data processing system 200 of FIG. 2, by host clients in network 102 of FIG. 1. Electronic invitations 302-304 are communicated to data processing system 200 on issue by respective clients. In the illustrative example, invitations 302-304 are issued by User_1, User_2, and User_3 operating clients 108, 110 and 112 and are received by User_4 at client 106. Invitations 302-304 are displayed to the user on a display terminal in a graphical user interface that includes user selectable options (designated Accept and Decline). A decline response is communicated to the issuer of the invitation when the user selects the Decline option of a particular invitation and the invitation is discarded from data processing system 200. When the user selects the Accept option of an invitation, an acceptance message is returned to the issuer of the invitation. The electronic calendar of the invitee is updated to record the scheduled event. For example, the electronic calendar may include or access a table or other schedule store that maintains records of accepted scheduled events and associated properties. The schedule store may be maintained on a storage device, such as hard disk 226.

Assume for illustrative purposes that the each of invitations 302-304 are accepted by the invited user. As show in FIG. 3, invitations 302-304 represent a scheduling conflict. For example, invitations 302 and 303 are concurrently scheduled, that is invitations 302 and 303 correspond to events having identical date, start, and end times. Additionally, invitation 304 corresponds to an event that has a scheduled date and time that partially overlaps with the scheduled date and event times of invitations 302 and 303.

When the user accepts an invitation, an acceptance message indicating the invitee acceptance is communicated to the inviting user, e.g., client 106. The electronic calendar system of the inviting user is then updated to reflect the acceptance of the invitees scheduled attendance. The inviting user may then plan the scheduled event accordingly. In the present example, the invited user can only attend one of the scheduled events, and thus the acceptance messages communicated to the other inviting users does not provide an accurate indication of the respective event attendances. In accordance with a preferred embodiment of the present invention, an electronic calendar system periodically evaluates the scheduled events of users to determine schedule conflicts and to calculate an estimated count of attendees that may attend a scheduled event.

Figure 4:
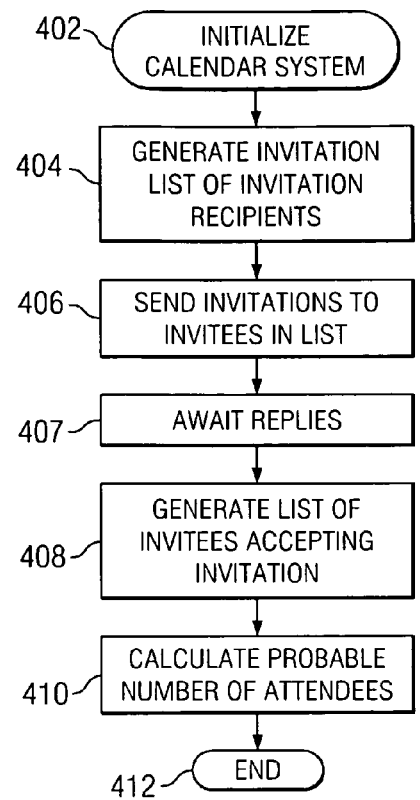
FIG. 4 is a flow chart of processing performed by an electronic calendar system for resolving scheduling conflicts according to a preferred embodiment of the present invention.

FIG. 4 is a flow chart of processing performed by the electronic calendar system for resolving scheduling conflicts according to a preferred embodiment of the present invention. The electronic calendar system is initialized (step 402), and an invitation list of invitees is generated (step 404). Generation of an invitation list may be performed by input of a set of email address, network device addresses, user names, or the like by the inviting user.

An invitation message is sent to each of the invitees of the invitation list (step 406) and the electronic calendar system awaits reply messages (step 407). A list or record of potential attendees is generated in response to receipt of acceptance messages by data processing system 200 (step 408). A probable number of attendees that may be expected to attend the event is then calculated based on the acceptance messages and detected schedule conflicts. The number of calculated probable attendees may then be retrieved, displayed, or otherwise provided to the user of data processing system 200. The calendar application may then exit (step 412).

Figure 5:
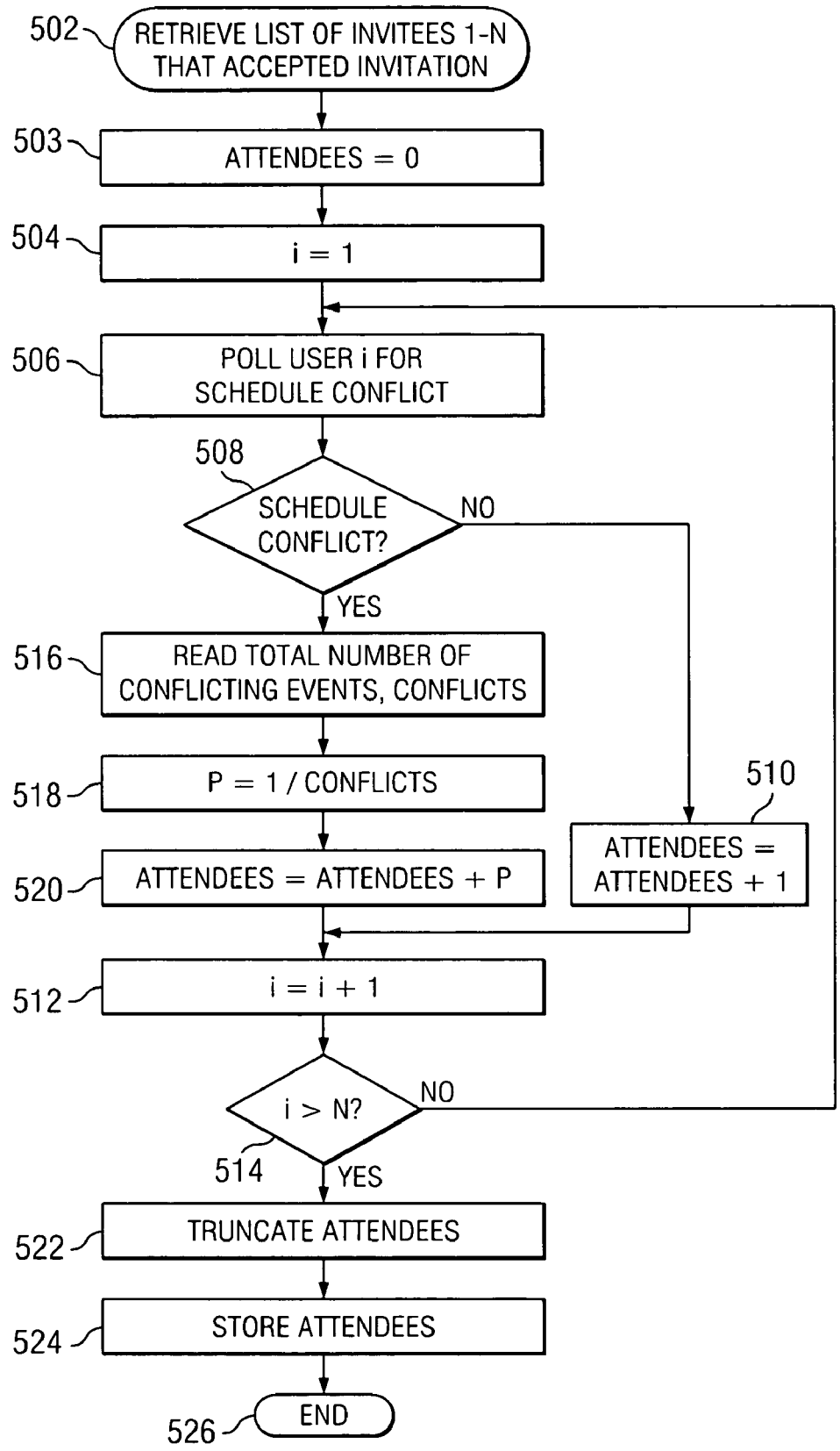
FIG. 5 is a flowchart of processing performed by the electronic calendar system for calculating the count of probable attendees of a scheduled event in accordance with a preferred embodiment of the present invention.

FIG. 5 is a flowchart of processing performed by the electronic calendar system for calculating the count of probable attendees of a scheduled event in accordance with a preferred embodiment of the present invention. The electronic calendar system begins by retrieving a list or record of invitees that have accepted the invitation to a particular scheduled event (step 502). In the illustrative example, a number N of invitees have accepted respective invitations to a scheduled event. An Attendees variable that stores a value of the expected number of attendees to a scheduled event to which an electronic invitation has been issued is initialized to zero (step 503). A counter variable i is then initialized to 1 (step 504).

The electronic calendar system then polls user i for evaluation of any scheduling conflicts with the scheduled event (step 506). For example, the client from which the invitation was issued may send an interrogation to user i for an indication of any events that overlap or are commonly scheduled with the particular scheduled event. An evaluation is made to determine if a scheduling conflict exists for the interrogated user (step 508). If no scheduling conflict exists, the Attendees variable is incremented by one (step 510) and the counter variable i is incremented (step 512). A comparison of the counter variable with the number N of invitees that have accepted the invitation is then made (step 514). If all users of the invitees list have been evaluated, that is if the index variable i exceeds variable N, the calendar application proceeds to truncate the number of attendees (step 522).

If a scheduling conflict is detected at step 508, a total number of scheduled events are read into a Conflicts variable (step 516), and an attendance probability value (P) for that particular user is calculated based on the number of scheduled events (step 518). The probability value is a weighted factor for weighting the estimated attendance for the particular invitee being evaluated. For example, a real number may be calculated as a quotient of 1 divided by the number stored in the variable Conflicts of scheduled events. Thus, the probability value is reduced in proportion to the number of conflicting schedule events. That is, the probability value P provides a numerical indication of the probability that the user will attend the scheduled event based on the total number of conflicting events the user has elected to accept. The Attendees variable is then incremented by the probability value P and the electronic calendar system proceeds to increment the index variable i according to step 512.

When all of the electronic calendar systems of the invitees that have accepted the event invitation have been evaluated, the Attendees variable is truncated (step 522) and the value of the Attendees variable is stored or displayed (step 524). The electronic calendar system then exits (step 526).

Figure 6:
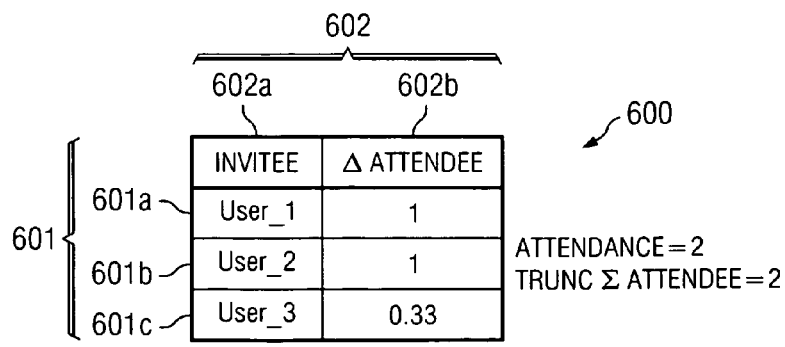
FIG. 6 is a diagrammatic illustration of an exemplary invitees list for calculating a weighted estimation of a number of attendees of a scheduled event in accordance with a preferred embodiment of the present invention.

FIG. 6 is a diagrammatic illustration of an exemplary invitees list for calculating a weighted estimation of a number of attendees of a scheduled event in accordance with a preferred embodiment of the present invention. The exemplary invitees list 600 comprises a table of records 601 and fields 602.

List 600 comprises a plurality of records 601 and fields 602. List 600 may be stored on disk drive 226, fetched therefrom by processor 202, and processed by data processing system 200 shown in FIG. 2. Each record 601a-601c, or row, comprises data elements in respective fields 602a-602b.

In the illustrative example, each or records 601a-601c stores in field 602a an invitee or user identifier of the associated client that has returned an event acceptance message to the inviting user or client. An attendee increment (ΔAttendee) amount is stored in field 602b. For example, the attendee increment amount may be set to the calculated probability value of each user that has issued an acceptance message. Assume three users User_1, User_2, and User_3 have accepted an invitation by an inviting user. Further assume that User_1 and User_2 have not accepted any conflicting scheduled events, and User_3 has accepted three concurrent schedule invitations. The electronic calendar system may periodically interrogate the client systems of User_1, User_2, and User_3 for identification of a schedule conflict. A return value indicating any identified schedule conflicts is then communicated from the client systems in response to the interrogation. For example, the return value may be an integer value indicating the number of concurrent or overlapping scheduled events associated with the particular user's client system being interrogated. Preferably, the return value provided by the client system only indicates the number of conflicting events and does not provide detailed information regarding a user's other scheduled events. In another embodiment, a user may be required to configure a calendar application to disclose schedule conflicts. In the illustrative example, User_1 and User_2 have no schedule conflict and thus a value of one is respectively assigned to field 602b of records 601a and 601b. User_3, having accepted an invitation to three concurrent events, is assigned a value of 0.33. The attendees increment values of field 602b may then be summed and truncated indicating a probable attendance of two attendees. In the illustrative example, the truncated sum (Attendance) of the attendee increments is two, thus indicating the likelihood that one less invitee that has accepted the invitation will actually attend the scheduled event. List 600 is preferably output on a display device for viewing by the inviting user. For example, list 600 may be displayed in a user interface so that an inviting user can easily identify users that have accepted an invitation to a scheduled event but that may potentially not attend the scheduled event. Additionally, the estimated attendance calculated as described above may be output for viewing by the user.

In accordance with another embodiment of the present invention, detected schedule conflicts may be used to calculate a meeting status value indicative of the likelihood that the scheduled meeting will be held. For example, a meeting status probability value having a range of zero to one may be calculated as a quotient of the number of invitees that have accepted the scheduled event and the total number of conflicting acceptance messages issued by the invitees that have accepted the invitation. For example, a meeting status for the example provided in FIG. 6 may be calculated as follows:

Meeting status: 3 invitees/5 acceptances=0.6

Additionally, a meeting status value may be translated to a corresponding color-coded graphic to visually indicate the current meeting status. For example, a scheduled event with a meeting status of 0.9 and above may be graphically coded as green for visual output on a display device, a scheduled event with a meeting status of 0.5 to 0.9 may be gray for visual output on a display device, and a meeting status value below 0.1 may be red for visual output on a display device. Thus, a user can easily identify the state or likelihood that a scheduled meeting will take place.

In yet another embodiment, the meeting status may be viewed by at least one of the invitees. For example, an invitee may interrogate an inviting user's calendar for a meeting status value. The meeting status value may be conveyed to an interrogating invitee as a numerical value calculated as a quotient as described above.

Thus, the Attendees variable provides a calculation of the number of invitees that may be expected to attend a scheduled event by accounting for scheduling conflicts of invited users. Users that have no scheduling conflict are accounted for by a unit increment of the Attendees variable. Users that are scheduled to attend one or more events that conflict with the event of the invitation are accounted for as a weighted increment of the Attendees variable. The weighted increment is preferably calculated directly proportional to the number of conflicting scheduled events. It should be understood that the description for calculating an estimated attendance is exemplary only, and other implementations may be suitably substituted for those described.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing event schedules, the method comprising the computer implemented steps of:
   initializing a calendar system;
   generating, using a processor, an invitation list;
   sending an invitation to a first scheduled event having a scheduled event time to a plurality of users in the invitation list;
   receiving a plurality of acceptance messages associated with the first scheduled event having the scheduled event time, each of the plurality of acceptance messages associated with a respective user of the plurality of users;
   for each of the plurality of users for which an acceptance message has been received from, identifying, using the processor, a schedule conflict of a user associated with an acceptance message of the plurality of acceptance messages, wherein identifying the schedule conflict comprises accessing a schedule store of a data processing system that generated the acceptance message, wherein the schedule conflict of the user is identified if the schedule store contains a plurality of time-overlapping events with respect to the first scheduled event that the user has previously accepted in their own calendaring system;
   responsive to identifying the schedule conflict, calculating, using the processor, for each of the plurality of users, a probable attendance from the plurality of acceptance messages, wherein the probable attendance is calculated to be inversely proportional (1/x) to how many (x) of the plurality of time-overlapping events exist, with respect to the first scheduled event, that the user has previously accepted in their own calendaring system;
   displaying each of the plurality of users and the respective probable attendance for each of the plurality of users in a user interface;
   forming, using the processor, a meeting status value from the calculated probable attendance for each of the plurality of users; and
   conveying the meeting status value to at least one user associated with one of the plurality of acceptance messages.

2. A computer program product stored on a recordable-type computer readable medium for managing event schedules, the computer program product comprising:
   first instructions for initializing a calendar system;
   second instructions for generating an invitation list;
   third instructions for sending an invitation to a first scheduled event having a scheduled event time in the invitation list;
   fourth instructions for receiving a plurality of invitation acceptance messages of the scheduled event from a plurality of users;
   fifth instructions for interrogating the respective calendar system of each of the plurality of users for which an acceptance message has been received from, wherein interrogating the respective calendar system of each of the plurality of users includes identifying an event schedule in the respective calendar system that conflicts with the scheduled event;
   sixth instructions that calculates a respective probability value of attendance for each of the plurality of users for which an acceptance message has been received from, wherein at least one probability value is weighted for an identified schedule conflict of a user of the plurality of users, wherein the identified schedule conflict of the user occurs if the first scheduled event time overlaps with a plurality of preexisting calendared events that the user has previously accepted in their respective calendar system, wherein the weight of the probability value is inversely proportional to how many of the plurality of preexisting calendared events, that the user has previously accepted in their respective calendar system, time-overlap with the first scheduled event;
   seventh instructions for displaying each of the users and the respective probability value of attendance for each of the plurality of users in a user interface;
   eighth instructions for forming a meeting status value from the respective probability value of attendance for each of the plurality of users for which an acceptance message has been received from; and
   ninth instructions for conveying the meeting status value to the at least one user associated with one of the plurality of acceptance messages.

3. A data processing system for managing an electronic calendar system, comprising:
   a memory configured to store the electronic calendar system as a set of instructions;
   a processing unit configured to generate an invitation list;

the processing unit configured to send the invitation to a first scheduled event having a scheduled event time in the invitation list;

the processing unit configured to generate a list of users each associated with one of a plurality of acceptance messages;

a network adapter configured to receive the plurality of acceptance messages;

the processing unit, responsive to execution of the set of instructions, configured to interrogate the respective calendar system of each of the users for which an acceptance message has been received from, and calculates a respective probability value associated with each of the plurality of acceptance messages and weights a probability value of an associated acceptance message responsive to identification of at least one scheduling conflict, wherein the at least one scheduling conflict occurs if a given user has a plurality of time-overlapping events, with respect to the first scheduled event, that the given user has previously accepted in their respective calendar system, wherein the weight of the probability value is inversely proportional to how many of the plurality of time-overlapping events exists;

a display device configured to display a graphical output of the list of users on the display device;

the display device configured to display a meeting status value, wherein the meeting status value is visually represented as a color of a plurality of colors each corresponding to a range of the possible meeting status values to visually indicate a likelihood that the first scheduled event will occur, wherein the meeting status value is formed from the respective probability value of attendance for each of the plurality of users for which an acceptance message has been received from; and the processing unit configured to convey the meeting status value to the at least one user associated with one of the plurality of acceptance messages.

* * * * *